Figure 1:
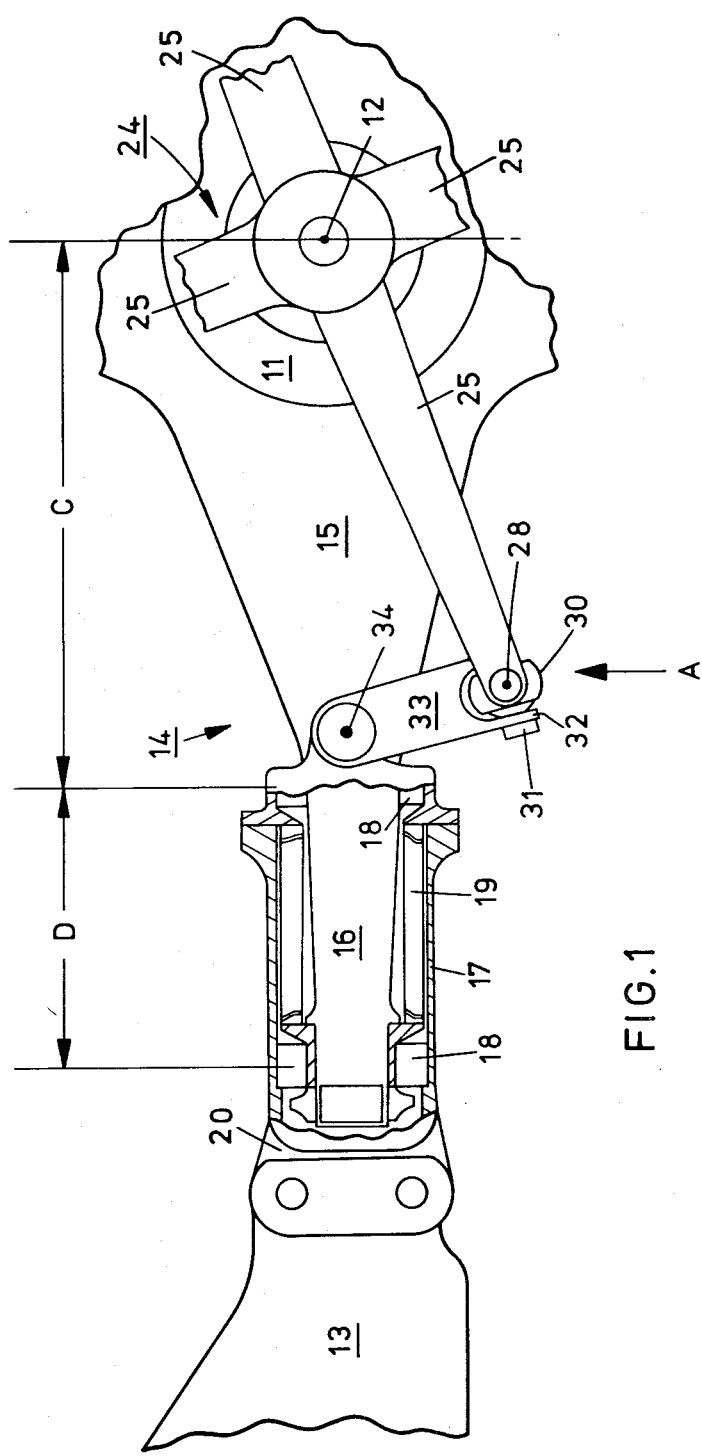

United States Patent [19]

Watson

[11] 4,080,098
[45] Mar. 21, 1978

[54] HELICOPTER ROTORS
[75] Inventor: Kenneth Watson, Yeovil, England
[73] Assignee: Westland Aircraft Limited, Yeovil, England
[21] Appl. No.: 728,185
[22] Filed: Sep. 30, 1976
[30] Foreign Application Priority Data
Oct. 13, 1975 United Kingdom ............... 41902/75
[51] Int. Cl.² ............................................. B64C 27/38
[52] U.S. Cl. .................... 416/103; 416/138; 416/141
[58] Field of Search ................................ 416/102–104, 416/138 A, 141, 106, 107, 174, 136, 147, 148, 114

[56] References Cited
U.S. PATENT DOCUMENTS

| | | | |
|---|---|---|---|
| 2,418,030 | 3/1947 | Hirsch | 416/103 |
| 2,557,338 | 6/1951 | Caldwell | 416/140 A |
| 2,677,429 | 5/1954 | Laufer | 416/114 |
| 2,692,650 | 10/1954 | Pullin et al. | 416/103 |
| 3,026,942 | 3/1962 | Cresap | 416/102 X |
| 3,484,172 | 12/1969 | Reed | 416/102 X |
| 3,926,536 | 12/1975 | Ciastula et al. | 416/141 X |
| 4,021,141 | 5/1977 | Watson | 416/141 |

FOREIGN PATENT DOCUMENTS

| | | | |
|---|---|---|---|
| 464,507 | 4/1950 | Canada | 416/114 |
| 825,446 | 12/1959 | United Kingdom | 416/102 |

Primary Examiner—Everette A. Powell, Jr.
Attorney, Agent, or Firm—Larson, Taylor and Hinds

[57] ABSTRACT

This invention relates to helicopter rotors having three or more blades and of the type having a hollow rotor drive shaft and a control column positioned within the hollow shaft arranged to support a spider assembly at its upper end through which control movements are transmitted to the rotor. In the present invention, the inner ends of at least two of the arms of the spider are retained in fixed relationship and the outer end of each arm is connected to its respective feathering hinge through a vertical pivot located on an axis at an operational radius not greater than a radius of a point about which blade lead/lag movements occur. This arrangement serves to establish a virtual floating fulcrum about which the control column is tilted during operation to impart control movements, and thereby eliminates the complicated mechanical support means that are a feature of prior rotors of this type.

15 Claims, 5 Drawing Figures

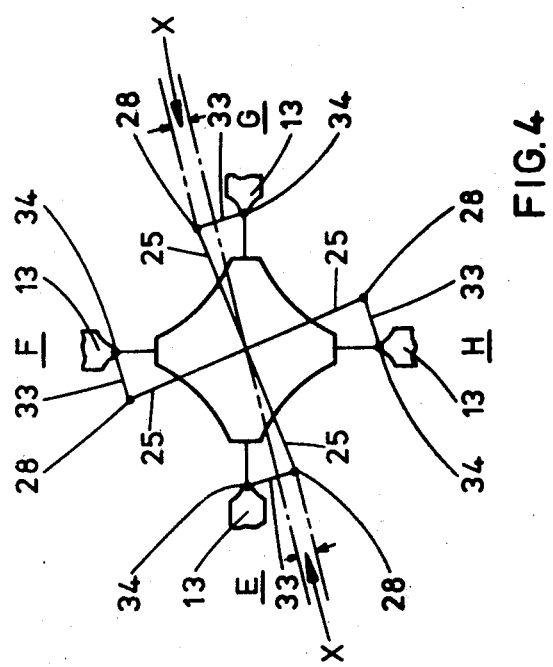
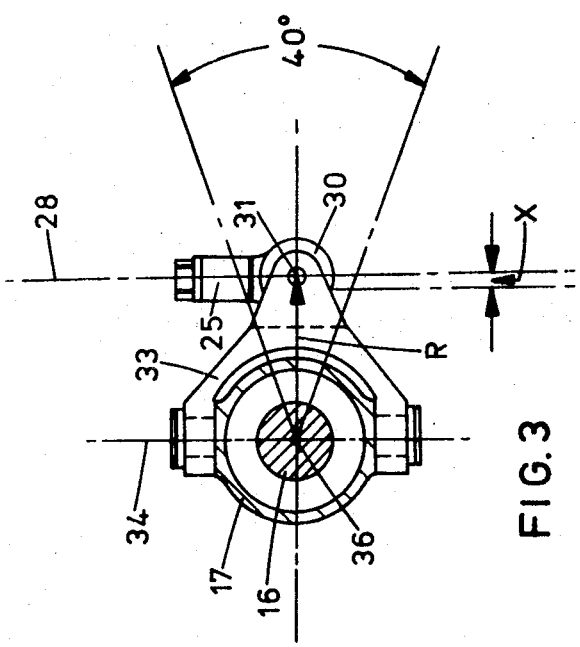
FIG. 4
FIG. 3

HELICOPTER ROTORS

This invention relates to helicopter rotors, and particularly to rotors having a generally hollow drive shaft housing a control means through which control movements are transmitted to the blades of the rotor.

In a prior arrangement, a control column is housed within the hollow drive shaft and protrudes from an upper end thereof for connection to the blades through a spider mechanism and connecting links. The connecting links are attached to the blades radially outwardly of a lag hinge so that lag movements are transmitted through the linkage to the arms of the spider. In order to cater for this movement, the arms are rotatably mounted at the upper end of the control column for independent rotational movements, and this dictates that the control column is supported within the hollow shaft so as to provide a positive fulcrum about which cyclic pitch changes are imparted to the blades. Additionally, mechanical means are also required so as to provide for axial movements of the fulcrum to impart collective pitch changes to the blades.

Thus the control column is supported on a bearing such as a spherical bearing or trunnion type universal bearing to allow tilting of the spider to effect cyclic pitch changes, and on axial splines or a piston arrangement to effect vertical movement to adjust the collective pitch setting of the blades.

These arrangements are heavy, complicated in manufacture, and are difficult to service and repair due to the parts being buried within the hollow shaft, which is often located through a gearbox, thereby adding further complications in this respect.

It is an object of the present invention to provide a helicopter rotor of the type hereinbefore defined wherein the control column is unsupported intermediate its upper and lower ends within the hollow rotor drive shaft, thereby simplifying manufacture and servicing and maintenance requirements and procedures.

In one aspect the invention provides a helicopter rotor including at least three rotor blades extending radially from a rotor hub having a central aperture and attached at an upper end of a hollow rotor for rotation about a generally vertical axis drive shaft, a feathering hinge and means providing for rotor blade flap and lead-lag/movements during operation, a control column positioned within the hollow drive shaft with an upper end protruding through the aperture in the hub and a lower end connected to a flying control system, the upper end of the control column supporting generally radially extending arms equal in number to the number of rotor blades, inner ends of at least two of the arms being retained in fixed relationship and an outer end of each arm being pivotally connected to a pitch lever that is connected to its respective feathering hinge for pivotal movement about a generally vertical axis, the axis being located at an operational radius not greater than a radius of an innermost position about which lead-lag movements occur, whereby the contro column is unsupported intermediate its ends within the hollow shaft and a floating fulcrum is established about which the control column is tilted to change the pitch of the blades. In one form of the invention the arms in fixed relationship may be integral with the control column. In another form of the invention the arms in fixed relationship may be rotatably mounted on the control column.

In a particular form of the invention for a four-bladed rotor the radially extending arms comprise two opposed pairs, the inner ends of each pair being retained in fixed relationship. Preferably one pair of opposed arms are integral with the control column and the other pair of opposed arms are rotatably mounted on the control column.

The outer end of each arm may be pivotally mounted on a spindle extending generally vertically upwardly from a universal joint attached to the pitch control lever.

The pitch control lever may comprise a generally U-shaped lever having a fork end portion at its apex providing attachment for the universal joint which may, conveniently, be in the form of a ball joint attached about a generally horizontal axis. The legs of the lever may be arranged to straddle an outer surface of a rotatable housing forming part of the feathering hinge and may provide the means of attachment of the pitch control lever about the vertical axis. The axis may be arranged to pass through the rotational axis of the feathering hinge.

Conveniently, the control column fulcrum may be located in a plane bisecting a centre of the plurality of universal joints.

The rotor hubs may include flexure members providing for the rotor blade flap and lead/lag movements, and the flexure members may comprise, for each blade, an inner flexure member extending outwardly from the hub to accommodate the majority of blade flap movements during operation and an outer flexure member to accommodate the majority of blade lead/lag movements during operation.

The outer flexure member may comprise a radially extending generally circular spindle formed integral with the inner flexure member. Conveniently, the spindle may be arranged to support feathering hinge bearings that may include elastomeric radial bearings to permit rotational movements of the feathering hinge, and an elastomeric thrust bearing through which, during operation, centrifugal loads may be transmitted from the rotor blade to the hub.

In another aspect the invention provides a helicopter rotor including at least rotor blades connected to a hub by flexure members, each flexure member comprising an inner part arranged to accommodate the majority of rotor blade flap movements during operation and an outer part arranged to accommodate the majority of rotor blade lead/lag movements during operation, each outer part comprising a radially extending spindle formed integral with the inner part, a feathering hinge comprising a generally cylindrical housing mounted on radial bearings secured adjacent each end of the spindle and having an outer end arranged for attachment of a rotor blade, the rotor hub having a central aperture and being secured at the upper end of a hollow rotor drive shaft for rotation about a generally vertical axis, a control column positioned within the hollow drive shaft with an upper end protroding through the aperture in the hub and a lower end attached to a helicopter flying control system, the upper end supporting a spider assembly comprising a plurality of radially extending arms equal in number to the number of rotor blades, inner ends of at least two of the arms being retained in fixed relationship so as to prevent relative movements therebetween, an outer end of each arm being pivotally mounted about a generally vertical axis on a spigot extending from a universal joint that is mounted on a generally horizontal axis at the apex of a U-shaped pitch control lever, the legs of the pitch control lever being arranged to straddle the housing of the feathering hinge and pivotally attached thereto about a generally vertical axis, the axis being located at an operational radius not greater than a radius of an innermost position at which lead/lag movements occur and arranged to pass through a rotational axis of the feathering hinge.

Figure 2:
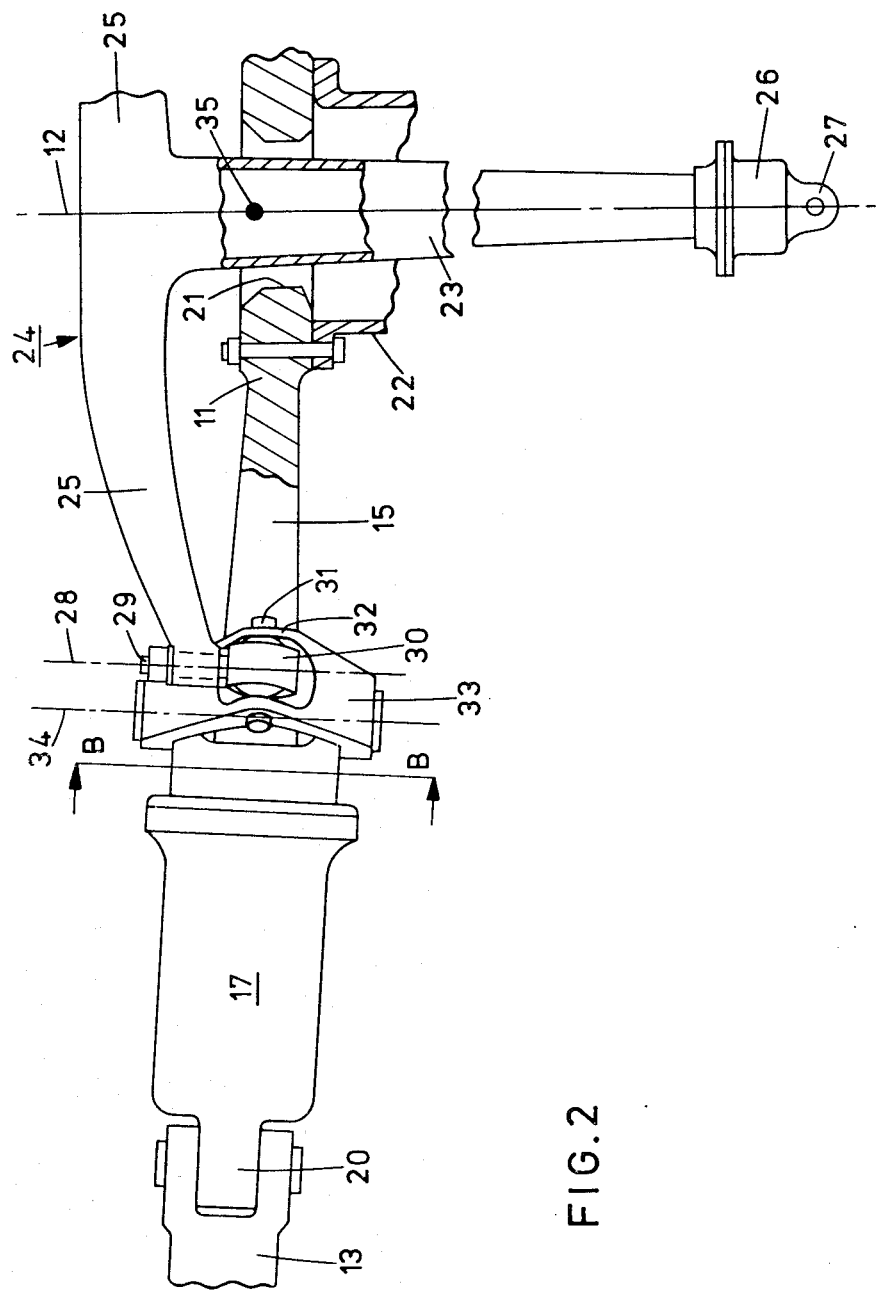
Figure 5:
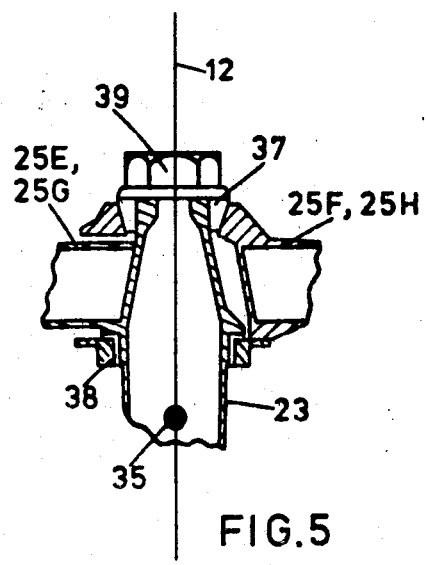

The invention will now be described by way of example only and with reference to the accompanying drawings in which:

FIG. 1 is a fragmentary part sectioned plan view of a four-bladed helicopter rotor according to one embodiment, FIG. 2 is a fragmentary part sectioned view on arrow A of FIG. 1, FIG. 3 is a part sectioned view taken on lines B—B of FIG. 2, FIG. 4 is a diagrammatic plan view, and FIG. 5 is a fragmentary part sectioned view similar to FIG. 2 and showing a further embodiment.

Referring now to FIGS. 1 and 2, a helicopter rotor comprises a hub 11 arranged for rotation about a generally vertical axis 12. Each of four rotor blades 13 are attached to the hub 11 through flexure members generally indicated at 14 and comprising an inner part 15 and an outer part 16.

The inner part 15, extending through distance C in FIG. 1, is formed integral with the hub 11 and tapers from a substantially parallel sided cross-section elongated in a horizontal plane at the hub 11 to a substantially circular cross-section at its outer end, and is resiliently flexible in a plane generally perpendicular to the plane of rotation (the flap plane).

The outer part, extending through distance D in FIG. 1, comprises a spindle 16 formed integral with an outer end of the inner part 15 to extend radially therefrom. The spindle 16 is resiliently flexible in a plane generally coincident with the plane of rotation (lead/lag plane), and is of circular cross-section, to ensure that its stiffness in the flap plane matches its stiffness in the lead/lag plane.

A cylindrical housing 17 is supported by spaced-apart radial elastomeric bearings 18 secured adjacent each end of the spindle 16, and an elastomeric thrust bearing 19 is located within the housing. A flanged portion 20 formed at the outer end of the housing 17 provides a bolted attachment for the rotor blades 13.

In the operation of such a semi-rigid rotor system, resilient flexing of the inner parts 15 accommodates the majority of the blade flap movements of all the individual parts of the assembly within distance C of FIG. 1, while resilient flexing of the outer parts comprising the spindles 16, accommodates the majority of the blade lead/lag movements of all the individual parts of the assembly within distance D of FIG. 1. Pitch changes of the rotor blades 13 are accommodated through rotation of the feathering hinge comprising the housing 17 and bearings 18 on the spindle 16, and blade centrifugal loads are transmitted to the hub 11 through the thrust bearing 19.

It should be understood that the foregoing description is exemplary only, since the control system now to be described can be used with other rotor constructions, as hereinafter explained.

The rotor hub 11 has a central aperture 21, and is secured at the upper end of a hollow rotor drive shaft 22 that is arranged for rotation about the axis 12 by a suitable power source and transmission system (not shown).

A generally vertically extending control column 23 is positioned within the hollow drive shaft 22. An upper end of the control column 23 protrudes through the central aperture 21 in the hub 11 and is formed with a spider assembly (generally indicated at 24) comprising four radially extending arms 25 formed integral with the control column 23, one arm 25 for each of the four rotor blades 13 in the particular embodiment being described.

A lower end of the control column 23 is provided with a housing 26 mounted on bearings (not shown) for rotational movement relative the column 23 so as to permit rotation of the control column with the rotor, the housing 26 being provided with an apertured lug 27 for connection to a flying control system (not shown).

An outer end of each arm 25 is pivotally attached about a generally vertical axis 28 to a spigot 29 extending vertically upwardly from a universal joint comprising a ball joint 30. The ball joint 30 is secured through a generally horizontal attachment 31 in a fork end 32 formed at the apex of a U-shaped pitch control lever 33, the legs of the lever 33 being arranged to straddle an outside diameter at an inner end of the housing 17, and being pivotally attached thereto about a generally vertical axis 34 (FIG. 3).

In the embodiment shown the rotor is illustrated in an at rest position in which the geometrical centres of the ball joints 30 and the spindle 16 are arranged to lie in the same horizontal plane. The axis 34 also passes through the center of the spindle 16, being the rotational axis of the feathering hinge, and is located slightly inboard of the intersection between dimensions C and D (FIG. 1), at which point resilient flexing of the spindle 16 commences during operation to permit blade lead/lag movements.

The helicopter flying controls are connected to boss 27 on the housing 26 at the lower end of the control column 23, and are arranged to swing the lower end of the control column 23 in both a fore-and-aft and lateral plane and to move the control column 23 vertically within the drive shaft. The linkage comprising the control column 23, spider 24 and lever 33 are arranged such that swinging movements tilt the control column 23 about a virtual floating fulcrum 35 whose position is established by the swinging movements and the geometry of the linkage which ensures that side or shear loads in the spider 24 are reacted through the feathering hinges. The fulcrum 35 is located in a plane bisecting the geometral centres of the ball joints 30, and requires no mechanical location so that the control column 23 is completely unsupported intermediate its upper and lower ends within the hollow drive shaft 22. Tilting movements of the control column 23 about the fulcrum 35 are effective to impart cyclic pitch changes to the rotor blade 13, and vertical movements of the control column 23 are effective to impart collective pitch changes to the rotor blades 13.

These control movements will now be defined in detail with reference to FIGS. 3 and 4. From FIGS. 3 it will be clear that rotation of the housing 17 to effect control movements of the blades takes place about an axis 36 of the spindle 16. Since such rotational movement is transmitted through the lever 33 from the horizontal axis 31 of the ball joint 30, the axis 31 will be moved around the axis 36 in an arc having a radius R struck from the axis 36, thus causing a variation in the distance between axes 34 and 28 during such movement.

This movement is permitted by pivoting about the axes 34 and 28 respectively.

Suppose that the maximum arc of movement to effect full cyclic control in say the fore-and-aft plane is 40° (plus and minus 20° from the "at rest" position) as shown in FIG. 3, then the axis 28 is moved towards the axis 34 by an amount equal to dimension X in FIG. 3.

In relating this movement of the axis 28 to the overall control system, reference is had to FIG. 4 which is a diagram of the linkage of the present control system. In the four-bladed arrangement shown in FIG. 4 in which the arms 25 are integral with the control column 23, the blades have been identified by the letters E, F, G and H, and in the following description these letters will be used to identify parts of the control system associated with a particular blade. Assume that full fore-and-aft cyclic pitch is to be applied with neutral collective and that this results in blade 13E being pivoted downwardly through 20° and blade 13G being pivoted upwardly by 20°, Such tilting movement is permitted by ball joints 30 on axes 28F and 28H and, as explained above, will result in axes 28E and 28G moving towards axes 34E and 34G respectively, each by an amount equal to dimension X so that the outer ends of arms 25E and 25G move to the position shown exaggerated in broken line in FIG. 4.

In the integral assembly shown, this movement of the outer end of each of the arms 25E and 25G through dimension X is permitted by in-plane flexing of the arms and is shared equally between all four arms 25E, 25F, 25G and 25H.

This example is given to illustrate the principle of control, however, it will be appreciated that the actual amount of movement of the axes 28E, 28F, 28G and 28H will depend on the degree of cyclic control movement applied and in which direction, and will also be affected by an application of either positive or negative collective pitch superimposed on a cyclic pitch setting or vice versa. For instance, the effect of applying full positive collective pitch in addition to the full fore-and-aft cyclic in the four-bladed arrangement of FIGS. 4 would result in virtually no movement of axis 28G, and a slightly greater movement of axis 28E accompanied by a small lateral movement of axes 28F and 28G in the same direction. Due to the fixed lengths of arms 25F and 25H this lateral movement results in a small lateral change in the position of the fulcrum 35 that is permitted by the present invention due to the fulcrum 35 requiring no mechanical support within the drive shaft 22.

It is a feature of the present invention that axis 34 is located either on or closely inboard of the point at which lead/lag movements commence during operation, thereby eliminating or minimising additional movement of the position of axes 28 caused by lead and lag movements, and consequently minimising further deflection of the arms 25 resulting therefrom.

The integral assembly of the arms 25 and the control column 23 has been selected for descriptive purposes to illustrate an arrangement suitable for rotors having three or more blades. However, in a preferred embodiment for a four-bladed rotor, the two pairs of opposed arms 25 are mounted at the top of the control column 23 for relative rotational movements about the axis 12 so that the movements of the axes 28 are accommodated by pivotal movements of the pairs of opposed arms 25 about the axis 12, and not by flexing of the arms 25 as hereinbefore described in respect of the embodiment of FIGS. 1 and 2.

Such an arrangement for a four-bladed rotor is shown in FIG. 5 which is a fragmentary sectioned view showing one arm only of each of the two pairs of opposed arms 25. This is for ease of illustration and it will be understood that the two arms 25 shown in FIG. 5 are in fact generally perpendicular to each other in an operational configuration, as for instance arms 25E and 25H in FIG. 4.

In the embodiment of FIG. 5, one pair of opposed arms, say 25E and 25G as shown in FIG. 4, are formed integral with the control column 23, and the other pair of opposed arms 25F and 25H are mounted on upper and lower bearings 37 and 38 respectively, and are retained by a securing nut 39 for rotation relative arms 25E and 25G about the axis 12. It will also be understood that the pair of opposed arms 25E and 25G are capable of rotational movement relative arms 25F and 25H by virtue of the bearing (not shown) in housing 26 at the lower end of the control column 23 (FIG. 2).

In operation of the rotor of FIG. 5 reference will be had to the movements hereinbefore referred to in FIG. 4 in respect of the embodiment shown in FIGS. 1 and 2. Thus it will be seen that the deflection of both of the axes 28E and 28G is in a clockwise direction so that in the arrangement of FIG. 5 this will be accommodated by a rotation of the arms 25E and 25G about the axis 12, thereby eliminating the operational stresses in the arms caused by deflection between the inner and outer ends thereof as in the integral arrangement described in the embodiment of FIGS. 1 and 2. Differential movements in the spider of the embodiment of FIG. 5 are accomodated by both relative rotational movements between the pairs of opposed arms and, as in the embodiment of FIGS. 1 and 2, by automatic and continuous repositioning of the floating fulcrum 35 within the hollow rotor drive shaft.

It will be understood that a similar arrangement of independently rotatable arms can be incorporated on rotor systems having any number of blades, as long as the inner ends of at least one pair of arms are retained in fixed relationship either by being attached to each other or rigidly attached to the upper end of the control column so as to prevent relative movements therebetween, and to effectively interconnect the two respective pitch control levers at each end of the pair of arms. Additional arm(s) could then be mounted so as to be capable of rotation independently of the fixed pair of arms either independently or in further pairs or groups of more than two arms. Alternatively, additional individual arms could be rigidly attached to the upper end of the control column 23.

In rotors having other than four rotor blades, three being considered a minimum for satisfactory operation of the present invention, the principles of operation hereinbefore described in relation to a four-bladed rotor will apply although, of course, the actual number of blades will determine the geometry of the linkage so that operating characteristics, in particular in respect of deflections occurring during operation, will also vary.

The present invention can be incorporated in other types of semi-rigid rotor systems and in articulated rotor systems, although it should be noted that the feathering hinge or, in the case of a semi-rigid rotor the point at which control movements are imparted to the feathering hinge, should be located inboard of a lead/lag hinge (in an articulated rotor) or coincident or slightly inboard of a point at which lead/lag movements commence in a lead/lag flexure member (in a semi-rigid rotor).

The invention provides, therefore, a helicopter rotor of the type having a hollow rotor drive shaft, in which a control column positioned within the drive shaft is entirely unsupported intermediate its upper and lower ends and does not require the complicated mechanical attachments to the bore of the drive shaft, as do prior art systems. The rotor is, therefore, simpler, lighter and easier to manufacture, maintain and service than the prior art rotors. These advantages ensue from the geometry of the linkage disclosed in which the inner ends of at least one pair of arms 25 are retained in fixed relationship to prevent relative movements, the outer ends of the arms are secured directly to the pitch control lever through a ball joint and the pitch control lever is connected to the feathering hinge through a pivotal connection located at an operational radius from the axis of rotation not greater than a radius of a point or of an innermost portion about which lead and lag movements of the rotor blades occur during operation. This arrangement ensures that the side or shear forces are taken by the interconnected pair(s) of arms and respective pitch control levers to be reacted at the feathering hinges so that the control column is automatically supported for pivotal movement about the virtual floating pivot 35, thereby dispensing with the necessity to provide a mechanical pivot and sliding mechanism to effect cyclic and collective pitch changes respectively.

Modifications can be made to the embodiments hereinbefore described without departing from the scope of the invention as defined in the appended claims. For instance, the elastomeric bearings 18 could be replaced by mechanical bearings, in which case the semi-rigid rotor system may be of the type disclosed in our U.S. Pat. No. 3,926,536, in which the thrust bearing 19 is replaced by a tie-bar located within the feathering hinge and a lag flexure member is located entirely outboard of the feathering hinge. The ball joint 30 may be replaced by any suitable universal joint and such a joint may, especially in the integral arrangements disclosed, incorporate means to cater for the operational deflections occurring in the arms 25, thereby relieving the arms 25 of the loads imposed thereby.

I claim as my invention:

1. A helicopter rotor comprising, a rotor hub having a central aperture therein, at least three rotor blades extending from the rotor hub, a hollow rotor drive shaft having the upper end thereof attached to the rotor hub for rotating the hub about a generally vertical axis, feathering hinge means operatively connected with each of said rotor blades to provide for rotor blade flap and lead/lag movements of the rotor blades during operation, a control column disposed within the hollow drive shaft, said control column having the upper end thereof extending through the central aperture in the rotor hub and the lower end thereof being connected with a flying control system, said control column being free of any supporting means within the hollow shaft intermediate the ends thereof, at least three radial arms extending from the upper end of said control column, the inner ends of at least two of said radial arms being retained in fixed relationship, pitch control levers, the outer ends of said radial arms being pivotally connected with said pitch control levers, each of said pitch control levers being pivotally connected with a respective feathering hinge means about a generally vertical axis, said last named axis being disposed at an operational radius not greater than a radius of an innermost position about which lead and lag movements occur whereby the unsupported control column can be moved vertically and tilted about a floating fulcrum to change the pitch of the rotor blades.

2. A rotor as claimed in claim 1, wherein the arms in fixed relationship are integral with the control column.

3. A rotor as claimed in claim 1, wherein the arms other than those in fixed relationship are rotatably mounted on the control column.

4. A rotor as claimed in claim 1, wherein the rotor has four rotor blades and the radially extending arms comprise two opposed pairs, the inner ends of each pair of opposed arms being retained in fixed relationship.

5. A rotor as claimed in claim 4, wherein one pair of opposed arms are integral with the control column and the other pair of opposed arms are rotatably mounted on the control column.

6. A rotor as claimed in claim 1, wherein the outer end of each arm is pivotally mounted on a spigot extending generally vertically upwardly from a universal joint attached to the pitch control lever.

7. A rotor as claimed in claim 6, wherein the pitch control lever comprises a generally U-shaped lever having a fork-end portion at its apex providing attachment for the universal joint.

8. A rotor as claimed in claim 7, wherein legs of the U-shaped lever are arranged to straddle an outer surface of a rotatable housing forming part of the feathering hinge, means the legs providing the means of attachment of the pitch control lever about the vertical axis.

9. A rotor as claimed in claim 8, wherein the vertical axis passes through a rotational axis of the feathering hinge.

10. A rotor as claimed in claim 6, wherein the control column fulcrum is located in a plane bisecting a centre of the plurality of universal joints.

11. A rotor as claimed in claim 1, wherein the operational radius of the vertical axis of the pitch control lever is less than the radius of a position about which lead and lag movements occur.

12. A rotor as claimed in claim 1, wherein the rotor hub includes flexure members providing for the rotor blade flap and lead/lag movements.

13. A rotor as claimed in claim 12, wherein the flexure members comprise for each blade an inner flexure member to accommodate at least a majority of blade flap movements and an outer flexure member to accommodate at least a majority of blade lead and lag movements.

14. A rotor as claimed in claim 13, wherein the outer flexure member comprises a radially extending generally circular spindle formed integral with the inner part.

15. A rotor as claimed in claim 14, wherein the spindle supports at least two spaced-apart radial bearings forming part of the feathering hinge.

* * * * *